United States Patent
Rettick et al.

(10) Patent No.: US 11,110,969 B2
(45) Date of Patent: Sep. 7, 2021

(54) QUICK RELEASE FLOOR PANEL SYSTEM FOR A WORK MACHINE

(71) Applicant: Caterpillar Inc., Peoria, IL (US)

(72) Inventors: Matthew J. Rettick, Bloomington, IL (US); Colton T. Anderson, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/740,105

(22) Filed: Jan. 10, 2020

(65) Prior Publication Data

US 2021/0214017 A1    Jul. 15, 2021

(51) Int. Cl.
| | |
|---|---|
| *B60J 7/00* | (2006.01) |
| *B62D 25/24* | (2006.01) |
| *B62D 25/20* | (2006.01) |
| *B62D 33/06* | (2006.01) |
| *E02F 9/16* | (2006.01) |

(52) U.S. Cl.
CPC ............. *B62D 25/24* (2013.01); *B62D 25/20* (2013.01); *B62D 33/0604* (2013.01); *E02F 9/16* (2013.01)

(58) Field of Classification Search
CPC ... B60R 11/06; B60R 9/00; E04H 5/02; F42B 33/06; F42D 5/045; G07F 19/20; G07F 19/201; G07F 19/205; E05Y 2900/132; Y10S 414/134
See application file for complete search history.

(56) References Cited

U.S. PATENT DOCUMENTS

| | | | | | |
|---|---|---|---|---|---|
| 5,441,183 | A | * | 8/1995 | Frenzel ...................... | B60R 7/02 224/542 |
| 5,941,024 | A | * | 8/1999 | Journault ................ | E02D 29/12 52/20 |
| 5,979,725 | A | * | 11/1999 | Lehrman ................... | B60R 7/02 220/23.87 |
| 6,056,177 | A | * | 5/2000 | Schneider ................. | B60R 5/04 220/4.28 |
| 6,308,873 | B1 | * | 10/2001 | Baidas ...................... | B60R 7/02 217/15 |
| 7,628,440 | B2 | * | 12/2009 | Bernhardsson ........... | B60R 5/04 296/37.14 |

(Continued)

FOREIGN PATENT DOCUMENTS

| | | |
|---|---|---|
| JP | 2002038525 | 2/2002 |
| JP | 2002339406 | 11/2002 |

(Continued)

*Primary Examiner* — Kiran B Patel

(57) ABSTRACT

A work machine includes a frame and an operator cabin having a floor panel. The floor panel includes a floor plate, a floor mat, an access hole, and an access door assembly. The floor plate is connected to the frame. The floor mat is connected to the floor plate. The access hole is through the floor plate and the floor mat. The access door assembly is pivotally connected to the floor plate and positioned in the access hole. The access door assembly includes a door plate and a floor mat section. The door plate is pivotally connected the floor plate. The floor mat section is connected to and substantially covers the door plate. The access door assembly is configured to move between a closed state in which the access door assembly covers the access hole and an open state in which the access door assembly uncovers the access hole.

20 Claims, 4 Drawing Sheets

(56) References Cited

U.S. PATENT DOCUMENTS

| | | | | |
|---|---|---|---|---|
| 7,794,004 B2* | 9/2010 | Aebker | ................... | B60R 5/04 |
| | | | | 296/37.8 |
| 7,878,568 B2* | 2/2011 | Wu | ....................... | B62D 33/03 |
| | | | | 296/37.6 |
| 9,908,475 B2* | 3/2018 | Ayala Diaz | ........... | B60R 13/013 |
| 2002/0079721 A1* | 6/2002 | Colliar | .............. | B62D 33/0617 |
| | | | | 296/190.08 |
| 2005/0280286 A1* | 12/2005 | Kelley | ................... | E02F 9/163 |
| | | | | 296/190.08 |
| 2009/0026803 A1* | 1/2009 | Yano | ......................... | B60J 1/04 |
| | | | | 296/190.1 |
| 2010/0320794 A1* | 12/2010 | Maceri | .............. | B62D 25/2036 |
| | | | | 296/37.15 |
| 2011/0241379 A1* | 10/2011 | Obe | ................... | B62D 33/067 |
| | | | | 296/190.09 |
| 2013/0255176 A1* | 10/2013 | Roberts | ............... | E04B 1/8409 |
| | | | | 52/582.1 |

FOREIGN PATENT DOCUMENTS

| | | |
|---|---|---|
| JP | 5881128 | 3/2016 |
| WO | 2017086450 | 5/2017 |

* cited by examiner

2

QUICK RELEASE FLOOR PANEL SYSTEM FOR A WORK MACHINE

TECHNICAL FIELD

The present disclosure relates to a quick release floor panel system for a work machine.

BACKGROUND

In some circumstances, operators of agricultural, industrial, construction and other heavy machinery need quick access to the area below the operator cabin to check for, inter alia, fire and leaks. Japan Patent No. JP5881128, entitled "CARGO HANDLING VEHICLE," and filed on Dec. 19, 2014, is directed to a cargo handling vehicle capable of improving safety while protecting an operator from electric shock even when the operator inserts an arm through an opening of a vehicle body and touches an electric apparatus inside a vehicle body. Patent Cooperation Treaty Publication No. WO2017086450, entitled "LID OPENING/CLOSING STRUCTURE," and filed Nov. 19, 2015, is directed to a lid opening/closing structure that can be easily opened and that can ensure the required sealing pressure. There may be challenges not met by or additional features that may compliment such prior systems.

SUMMARY

In an example according to this disclosure, a work machine includes a frame and an operator cabin having a floor panel. The floor panel includes a floor plate, a floor mat, an access hole, and an access door assembly. The floor plate is connected to the frame. The floor mat is connected to the floor plate. The access hole is through the floor plate and the floor mat. The access door assembly is pivotally connected to the floor plate and positioned in the access hole. The access door assembly includes a door plate and a floor mat section. The door plate is pivotally connected the floor plate. The floor mat section is connected to and substantially covers the door plate. The access door assembly is configured to move between a closed state in which the access door assembly covers the access hole and an open state in which the access door assembly uncovers the access hole.

Another example according to this disclosure is a floor panel for an operator cabin of a work machine. The floor panel includes a floor plate, a floor mat, an access hole, and an access door assembly. The floor plate is configured to be connected to a frame of the work machine. The floor mat is connected to the floor plate. The access hole is through the floor plate and the floor mat. The access door assembly is pivotally connected to the floor plate and positioned in the access hole. The access door assembly includes a door plate and a floor mat section. The door plate is pivotally connected the floor plate. The floor mat section is connected to and substantially covers the door plate. The access door assembly is configured to move between a closed state in which the access door assembly covers the access hole and an open state in which the access door assembly uncovers the access hole.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Examples according to this disclosure are directed to a quick release floor panel system for a work machine.

Figure 1:
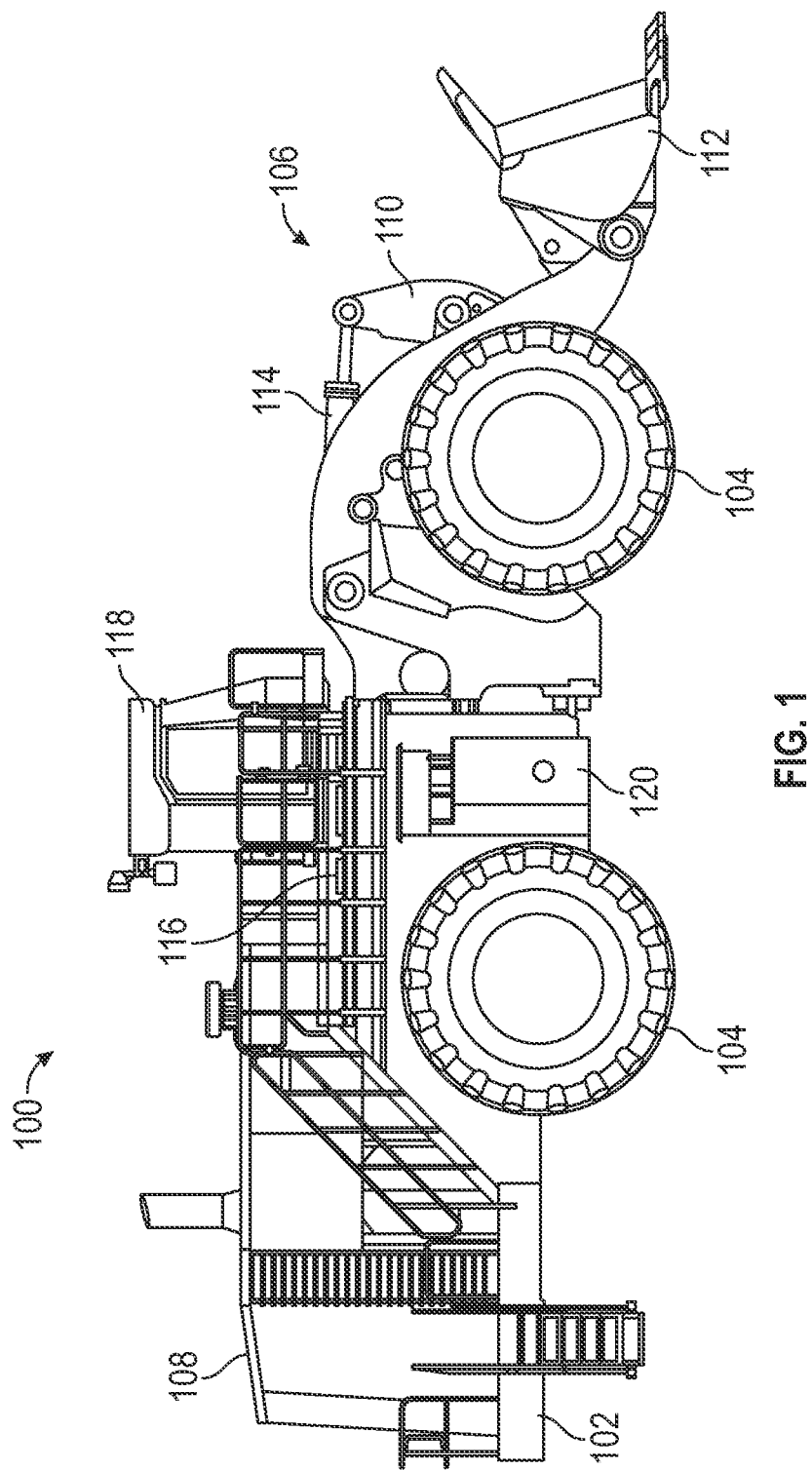
FIG. 1 is an elevation view depicting an example machine in accordance with this disclosure.

FIG. 1 depicts an example machine 100 in accordance with this disclosure. In FIG. 1, machine 100 includes frame 102, wheels 104, and implement 106. Example machine 100 is a wheel loader. In other examples, however, the machine may be other types of machines related to various industries, including, as examples, construction, agriculture, forestry, transportation, material handling, waste management, and so on. Accordingly, although a number of examples are described with reference to a wheel loader machine, examples according to this disclosure are also applicable to other types of machines including graders, scrapers, dozers, excavators, compactors, material haulers like dump trucks, along with other example machine types.

Machine 100 includes frame 102 mounted on four wheels 104, although, in other examples, the machine could have more than four wheels. Frame 102 is configured to support and/or mount one or more components of machine 100. For example, machine 100 includes enclosure 108 coupled to frame 102. Enclosure 108 can house, among other components, an engine and/or other drive system to propel the machine over various terrain via wheels 106. The engine can include various power generation platforms, including, for example, an internal combustion engine, whether gasoline or diesel.

Machine 100 includes implement 106 coupled to the frame 102 through linkage assembly 110, which is configured to be actuated to articulate bucket 112 of implement 106. Bucket 112 of implement 106 may be configured to transfer material such as, soil or debris, from one location to another. Linkage assembly 110 can include one or more cylinders 114 configured to be actuated hydraulically or pneumatically, for example, to articulate bucket 112. For example, linkage assembly 110 can be actuated by cylinders 114 to raise and lower and/or rotate bucket 112 relative to frame 102 of machine 100.

Platform 116 is coupled to frame 102 and provides access to various locations on machine 100 for operational and/or maintenance purposes. Machine 100 also includes an operator cabin 118, which can be open or enclosed and may be accessed via platform 114. Operator cabin 118 may include one or more control devices (not shown) such as, a joystick, a steering wheel, pedals, levers, buttons, switches, among other examples. The control devices are configured to enable the operator to control machine 100 and/or the implement 106. Operator cabin 118 may also include an operator interface such as, a display device, a sound source, a light source, or a combination thereof.

In an example, operator cabin 118 includes an input/output device to review and enter various parameters controlling operation of machine 100. For example, operator cabin 118 can include a touch-screen input and display device, by which an operator of machine 100 can review machine operating parameters and also enter desired values for such parameters. Machine 100 can also include a controller. The controller of machine 100 can include or be incorporated into various systems of machine 100. For example, the controller of machine 100 may be an electronic control unit (ECU) of machine 100. As another example, the controller of machine 100 may be included in/incorporated into a touch-screen device in operator cabin 118. In any event, the controller of machine 100 can be configured to execute one or more programs related to operation of machine 100.

Operator cabin 118 can also include a quick release floor panel system for work machine 100. For example, operator cabin can include a floor panel system by which an operator of machine 100 can quickly and easily open and close an access door in the floor of operator cabin 118 to gain access to areas underneath the cabin. In one example, operator cabin 118 includes a floor panel including a floor plate, a floor mat, an access hole, and an access door assembly. The floor plate is connected to frame 102 of work machine 100. The floor mat is connected to (or, in some examples, integral with) the floor plate. The access hole is through the floor plate and the floor mat. The access door assembly is pivotally connected to the floor plate and positioned in the access hole. The access door assembly includes a door plate and a floor mat section. The door plate is pivotally connected the floor plate. The floor mat section is connected to and substantially covering the door plate. The access door assembly is configured to move between a closed state in which the access door assembly covers the access hole and an open state in which the access door assembly uncovers the access hole.

Machine 100 can include a tank compartment connected to frame 102 and including fuel tank 120. Fuel tank 120 is fluidly coupled to the engine. Tank 120 is configured to store a fuel therein and serve as a source for supply of the fuel to the engine of machine 100. Machine 100 may also include other tanks, for example, to store and supply hydraulic fluid to implement 106 or other components of machine 100.

Machine 100 can be used in a variety of industrial, construction, commercial or other applications. Machine 100 can be operated by an operator in operator cabin 118. The operator can, for example, drive machine 100 to and from various locations on a work site and can also pick up and deposit loads of material using bucket 112 of implement 106. As an example, machine 100 can be used to excavate a portion of a work site by actuating cylinders 114 to articulate bucket 112 via linkage 110 to dig into and remove dirt, rock, sand, etc. from a portion of the work site and deposit this load in another location.

Figure 2A:
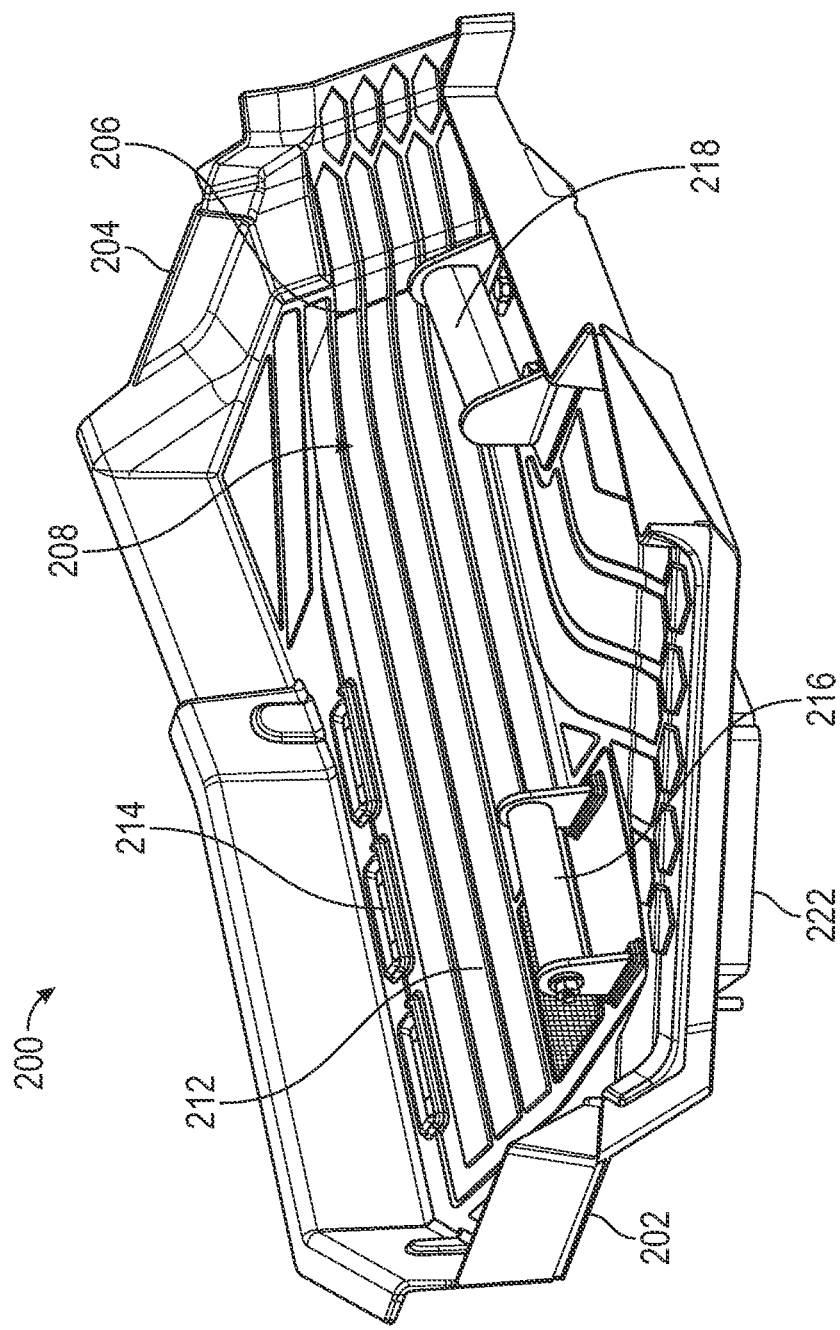
FIG. 2A is a perspective view depicting an example floor panel for an operator cabin of a work machine.
Figure 2B:
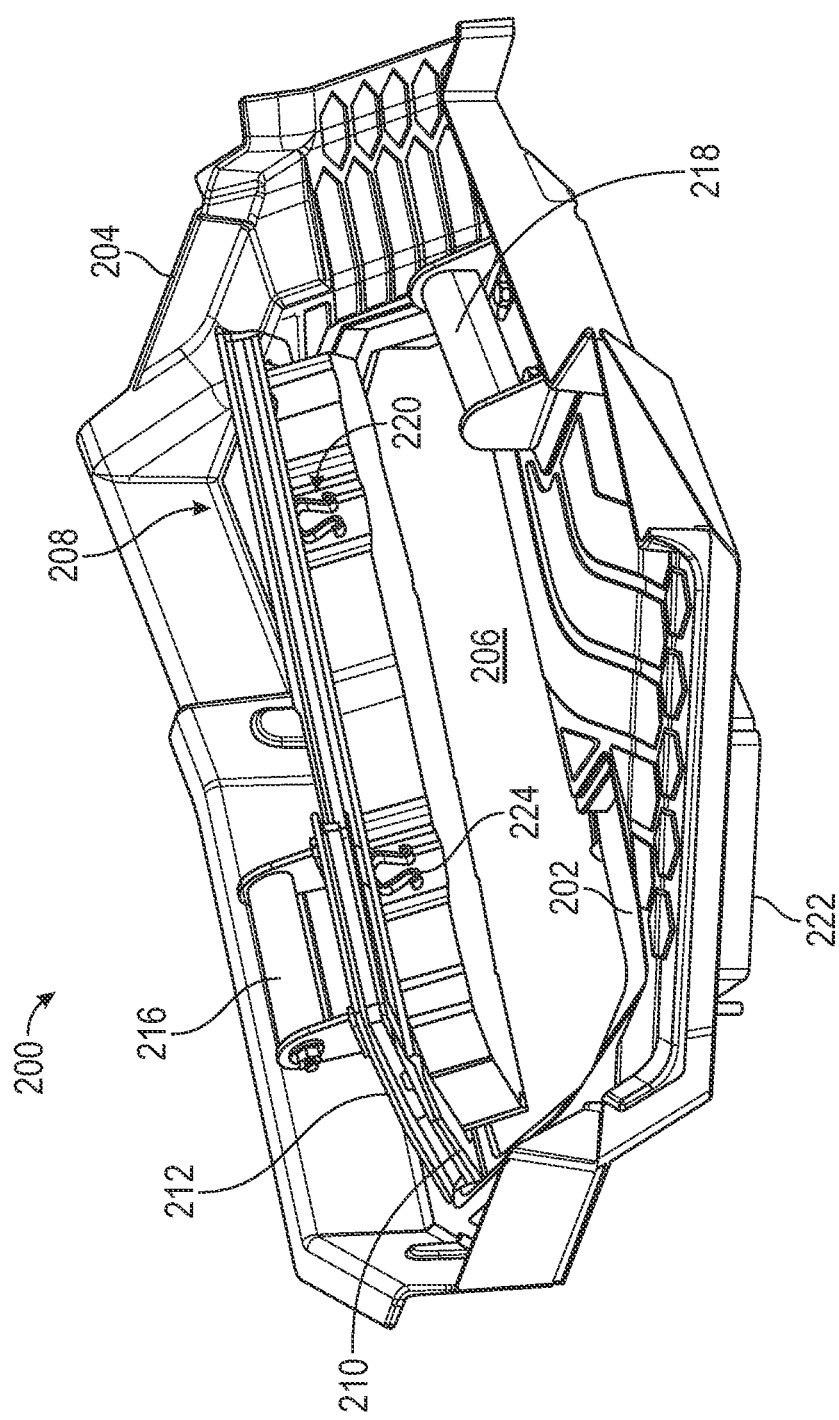
FIG. 2B is another perspective view depicting the example floor panel of FIG. 2 with an access door assembly of the floor panel open.
Figure 2C:
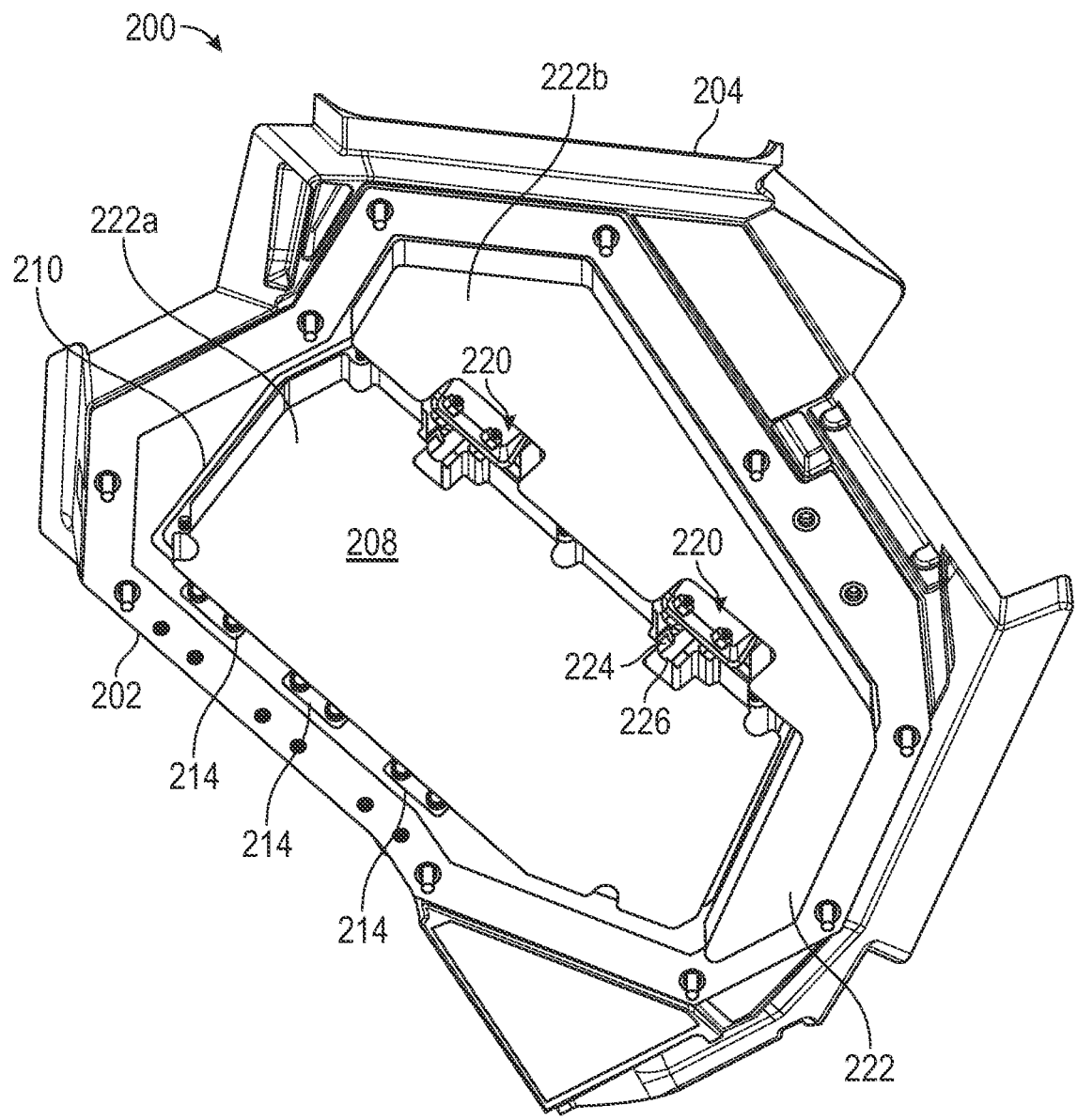
FIG. 2C is another perspective view depicting the bottom side of the example floor panel of FIGS. 2A and 2B.

FIGS. 2A-2C are perspective views depicting example floor panel 200 for an operator cabin of a work machine. In FIG. 2A, floor panel 200 includes floor plate 202, floor mat 204, access hole 206 (closed in FIG. 2), and access door assembly 208. Floor panel 200 can be included in an operator cabin of a work machine, including, for example, operator cabin 118 of work machine 100 of FIG. 1. Floor plate 202 of floor panel 200 can be connected to the frame of a work machine. Floor mat 204 is connected to or, in some examples, integral with floor plate 202. Access door assembly 208 is pivotally connected to floor plate 202 and positioned in access hole 206.

Access door assembly 208 includes door plate 210 (shown in FIG. 2B) and floor mat section 212. Referring to FIGS. 2A and 2B, door plate 210 is connected to floor plate 202. Floor mat section 212 is connected to and substantially covering door plate 210. Access door assembly 208 is configured to move between a closed state, as depicted in FIG. 2A, in which the access door assembly covers access hole 206 and an open state, as depicted in FIG. 2B, in which the access door assembly uncovers the access hole.

Referring to FIGS. 2A-2C, floor panel 200 also includes hinges 214, handle 216, foot pedal 218, latch 220, and insulation panel(s) 222. Example floor panel 200 includes three hinges 214 pivotally connecting door plate 210 of access door assembly 208 to floor plate 202. In other examples, a floor panel system could include more or fewer hinges, including, for example, two hinges 214 and four hinges 214. Hinges 214 allow door plate 210 to pivot relative to floor plate 202 to move access door assembly 208 between open and closed states. In an example, each of hinges 214 comprises a constant torque spring. The spring force of the constant torque springs in each of hinges 214 may be selected to provide a total a spring force that substantially counteracts a weight of access door assembly 208. Thus, once an operator releases access door assembly 208 from latch 220, spring loaded hinges 214 may function to bias access door assembly into an open state. In other examples according to this disclosure alternative weight counterbalance mechanisms may be employed, including, for example, pneumatic or hydraulic pistons, cams, pulleys, and/or springs, among other examples.

As noted above, floor panel 200 includes handle 216 and foot rest 218. Handle 216 is connected to and included as part of access door assembly 208. Handle 216 can be employed by an operator to open and close access door assembly. Additionally, handle 216, in the closed state of access door assembly 208, can be ergonomically positioned as a foot pedal for the operator of the work machine to which floor panel 200 is connected. Foot pedal 218 can be fixedly connected to floor plate 202 of floor panel 200 and can be ergonomically positioned for an operator to rest a foot on foot pedal 218 when operating the work machine.

Floor panel 200 includes two latches 220. Latches 220 pivotally connects access door assembly 208 to floor plate 202 and can be configured to hold access door assembly 208 in a closed state. Each of latches 220 can include a spring release mechanism that is configured to release access door assembly 208 to move from a closed into an open state. For example, referring to FIG. 2C, each of latches 220 include spring clip 224 and post 226. Spring clip 224 is connected to access door assembly 208 and is sized and shaped to selectively receive and release post 226, which is connected to floor plate 202 of floor panel 200.

Floor panel 200 also includes insulation panel 222. In general, insulation panel 222 is configured to insulate the operator cabin and operator from conditions underneath the operator cabin, including from conditions like fire or other temperature variations and/or sound. In the example of floor panel 200, insulation panel 222 includes a first insulation panel 222a and a second insulation panel 222b. First insulation panel 222a is connected to door plate 210. Second insulation panel 222b is connected to floor plate 202. First insulation panel 222a is sized and shaped to fit within an opening, channel, notch, or other aperture in or contour of second insulation panel 222b. Insulation panels employed in examples according to this disclosure can be fabricated from a variety of insulation materials.

INDUSTRIAL APPLICABILITY

In an operating example of a work machine according to this disclosure, the operator of work machine 100 manipulates machine 200 and bucket 112 of implement 106 to pick up and deposit loads of material using bucket 112. During operation of machine 100, the operator may become aware of one or more conditions occurring under the operator cabin. For example, the operator may detect or discover, either by visual or other sense perception or by some alarm, alert, sensor, etc., that a fire has ignited underneath the operator cabin. In such circumstances, the operator of machine 100 may need to inspect the area underneath the operator cabin.

The operator may bring machine 100 to a stop upon discovering the condition(s) underneath the cabin. The operator may then move feet and any other obstructions from over and/or on access door assembly 208. The operator can lift door plate 210 of access door assembly 208 using handle 216. The operator may exert enough force on access door assembly 208 to overcome the spring force of spring clips 224 on posts 226. As the operator lifts door plate 210, access door assembly 208 pivots relative to floor plate 202 at hinges 214 and access door assembly 208 moves from a closed state (FIGS. 2A and 2C) in which the access door assembly covers access hole 206 to an open state (FIG. 2B) in which the access door assembly uncovers the access hole through the operator cabin. Thus, the operator can gain access to areas underneath the operator cabin to inspect or attend to conditions found therein.

The above detailed description is intended to be illustrative, and not restrictive. The scope of the disclosure should, therefore, be determined with references to the appended claims, along with the full scope of equivalents to which such claims are entitled.

What is claimed is:

1. A work machine comprising:
   a frame;
   an operator cabin having a floor panel, the floor panel comprising:
      a floor plate connected to the frame;
      a floor mat connected to the floor plate;
      an access hole through the floor plate and the floor mat;
      an access door assembly pivotally connected to the floor plate and positioned in the access hole, the access door assembly comprising:
         a door plate pivotally connected the floor plate; and
         a floor mat section connected to and substantially covering the door plate, the access door assembly configured to move between a closed state in which the access door assembly covers the access hole and an open state in which the access door assembly uncovers the access hole.

2. The work machine of claim 1, wherein the access door assembly comprises at least one hinge connected between the door plate and the floor plate and configured to allow the door plate to pivot relative to the floor plate.

3. The work machine of claim 2, wherein the access door assembly comprises three hinges.

4. The work machine of claim 2, wherein the at least one hinge comprises a constant torque spring, the constant torque spring having a spring force that substantially counteracts a weight of the access door assembly.

5. The work machine of claim 1, wherein the access door assembly comprises a handle.

6. The work machine of claim 5, wherein, in the closed state of the access door assembly, the handle is ergonomically positioned as a foot pedal for an operator of the work machine.

7. The work machine of claim 1, further comprising at least one latch, the at least one latch configured to hold the access door assembly in the closed state.

8. The work machine of claim 7, wherein the at least one latch comprises a spring release mechanism configured to release the access door assembly to move from the closed state into the open state.

9. The work machine of claim 1, wherein the access door assembly comprises a first insulation panel connected to the door plate, the first insulation panel configured to insulate the operator cabin from at least one of sound and temperature variation.

10. The work machine of claim 9, wherein the floor panel comprises a second insulation panel, the second insulation panel configured to insulate the operator cabin from at least one of sound and temperature variation, and the first insulation panel of the access door assembly configured to fit within an opening in the second insulation panel.

11. A floor panel for an operator cabin of a work machine, the floor panel comprising:
    a floor plate configured to be connected to a frame of the work machine;
    a floor mat connected to the floor plate;
    an access hole through the floor plate and the floor mat;
    an access door assembly pivotally connected to the floor plate and positioned in the access hole, the access door assembly comprising:
       a door plate pivotally connected the floor plate; and
       a floor mat section connected to and substantially covering the door plate, the access door assembly configured to move between a closed state in which the access door assembly covers the access hole and an open state in which the access door assembly uncovers the access hole.

12. The floor panel of claim 10, wherein the access door assembly comprises at least one hinge connected between the door plate and the floor plate and configured to allow the door plate to pivot relative to the floor plate.

13. The floor panel of claim 12, wherein the access door assembly comprises three hinges.

14. The floor panel of claim 12, wherein the hinge comprises a constant torque spring, the constant torque spring having a spring force that substantially counteracts a weight of the access door assembly.

15. The floor panel of claim 11, wherein the access door assembly comprises a handle.

16. The floor panel of claim 15, wherein, in the closed state of the access door assembly, the handle is ergonomically positioned as a foot pedal for an operator of the work machine.

17. The floor panel of claim 11, further comprising at least one latch, the at least one latch configured to hold the access door assembly in the closed state.

18. The floor panel of claim 17, wherein the at least one latch comprises a spring release mechanism configured to release the access door assembly to move from the closed state into the open state.

19. The floor panel of claim 11, wherein the access door assembly comprises a first insulation panel connected to the door plate, the first insulation panel configured to insulate the operator cabin from at least one of sound and temperature variation.

20. The floor panel of claim 19, wherein the floor panel comprises a second insulation panel, the second insulation panel configured to insulate the operator cabin from at least one of sound and temperature variation, and the first insulation panel of the access door assembly configured to fit within an opening in the second insulation panel.

* * * * *